US008096766B1

(12) United States Patent
Downs

(10) Patent No.: US 8,096,766 B1
(45) Date of Patent: Jan. 17, 2012

(54) AIR COOLED TURBINE AIRFOIL WITH SEQUENTIAL COOLING

(75) Inventor: James P. Downs, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 578 days.

(21) Appl. No.: 12/351,624

(22) Filed: Jan. 9, 2009

(51) Int. Cl.
*F01D 5/08* (2006.01)
*F01D 5/20* (2006.01)

(52) U.S. Cl. .................. 416/96 R; 416/96 A; 416/97 R; 416/97 A

(58) Field of Classification Search ............... 416/96 R, 416/96 A, 97 R, 97 A
See application file for complete search history.

(56) References Cited

U.S. PATENT DOCUMENTS

| | | | |
|---|---|---|---|
| 3,515,499 A | 6/1970 | Beer et al. | |
| 3,628,880 A | 12/1971 | Smuland et al. | |
| 3,698,834 A * | 10/1972 | Meginnis | 416/96 R |
| 4,056,332 A | 11/1977 | Meloni | |
| 4,218,179 A * | 8/1980 | Barry et al. | 415/114 |
| 4,221,539 A | 9/1980 | Corrigan | |
| 4,252,501 A | 2/1981 | Peill | |
| 4,270,883 A | 6/1981 | Corrigan | |
| 4,314,794 A | 2/1982 | Holden et al. | |
| 4,565,490 A * | 1/1986 | Rice | 415/114 |
| 5,120,192 A | 6/1992 | Ohtomo et al. | |
| 5,993,156 A | 11/1999 | Bailly et al. | |
| 6,511,293 B2 * | 1/2003 | Widrig et al. | 416/96 R |
| 7,056,083 B2 * | 6/2006 | Gray | 415/115 |
| 7,137,779 B2 | 11/2006 | Liang | |
| 7,153,096 B2 | 12/2006 | Thompson et al. | |
| 7,198,458 B2 | 4/2007 | Thompson | |
| 7,255,535 B2 | 8/2007 | Albrecht et al. | |
| 7,497,655 B1 | 3/2009 | Liang | |
| 7,497,660 B2 | 3/2009 | Liang | |
| 7,625,180 B1 * | 12/2009 | Liang | 416/97 R |
| 7,690,892 B1 | 4/2010 | Liang | |
| 7,780,413 B2 * | 8/2010 | Liang | 416/97 R |
| 7,871,246 B2 | 1/2011 | Liang | |
| 7,901,181 B1 * | 3/2011 | Liang | 416/97 R |
| 7,921,654 B1 * | 4/2011 | Liang | 60/806 |
| 7,976,277 B2 | 7/2011 | Kopmels et al. | |
| 7,976,278 B1 | 7/2011 | Liang | |
| 2006/0222494 A1 | 10/2006 | Liang | |
| 2009/0232661 A1 | 9/2009 | Ryznic | |

* cited by examiner

*Primary Examiner* — David Zarneke
(74) *Attorney, Agent, or Firm* — John Ryznic

(57) ABSTRACT

An air cooled turbine airfoil, such as a rotor blade, with a sequential impingement cooling circuit that provides a high level of cooling with a low amount of cooling air. The airfoil is formed of a spar and shell construction in which the spar is formed from a series of alternating layers that form the cooling circuit with the shell forming the gap for the impingement cooling channels. Two different layers form the impingement cooling channels with a third layer being a separation layer. The impingement cooling circuit includes a first impingement circuit to cooling a forward half of the pressure side wall, a second impingement cooling circuit to cool the aft half of the pressure side wall, and a third impingement cooling circuit to cool the entire suction side wall. The spent cooling air is collected and channeled through a series of exit holes in the trailing edge to discharge the cooling air form the airfoil.

13 Claims, 3 Drawing Sheets

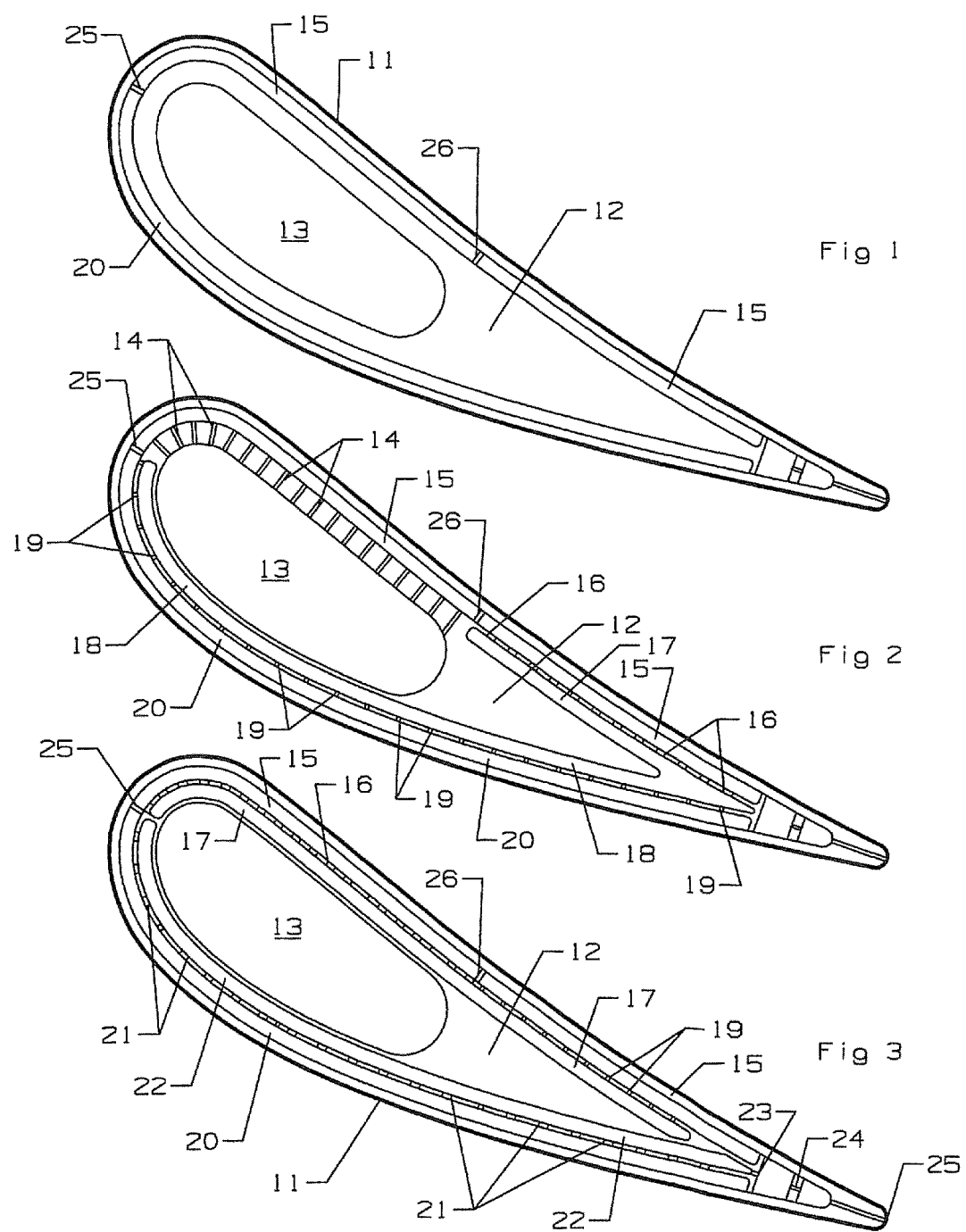

AIR COOLED TURBINE AIRFOIL WITH SEQUENTIAL COOLING

FEDERAL RESEARCH STATEMENT

None.

CROSS-REFERENCE TO RELATED APPLICATIONS

None.

BACKGROUND OF THE INVENTION

1. Field of the Invention

The present invention relates generally to a gas turbine engine, and more specifically to an air cooled turbine airfoil.

2. Description of the Related Art Including Information Disclosed Under 37 CFR 1.97 and 1.98.

In a gas turbine engine, air is first compressed to a high pressure in a compressor. The high pressure air is then mixed with fuel and burned at nearly constant pressure in the combustor. The high temperature gas exhausted from the combustor is then expanded through a turbine which then drives the compressor. If executed correctly, the exhaust stream from the turbine maintains sufficient energy to provide useful work by forming a jet, such as in aircraft jet propulsion or through expansion in another turbine which may then be used to drive a generator like those used in electrical power generation. The efficiency and power output from these machines will depend on many factors including the size, pressure and temperature levels achieved and an agglomeration of the efficiency levels achieved by each of the individual components.

Current turbine components are cooled by circulating relatively (to the gas turbine engine) cool air, which is extracted from the compressor, within passages located inside the component to provide a convective cooling effect. In many recent arrangements, the spent cooling flow is discharged onto the surfaces of the component to provide an additional film cooling effect.

The challenge to cool first stage turbine vanes (these are exposed to the highest temperature gas flow), in particular, is complicated by the fact that the pressure differential between the vane cooling air and the hot gas which flows around the airfoil must necessarily be small to achieve high efficiency. Specifically, coolant for the first stage turbine vane is derived from the compressor discharge, while the hot gas is derived from the combustor exit flow stream. The pressure differential available for cooling is then defined by the extremely small pressure drop which occurs in the combustor. This is because the pressure of the coolant supplied to the vane is only marginally higher than the pressure of the hot gas flowing around the airfoil as defined by the combustor pressure loss, which is desirably small. This pressure drop is commonly on the order of only a few percentage points. Further, it is desirable to maintain coolant pressure inside the vane higher than the pressure in the hot gas flow path to insure coolant will always flow out of the vane and not into the vane. Conversely, in the event hot gas is permitted to flow into the vane, serious material damage can result as the materials are heated beyond their capabilities and progression to failure will be swift. As a consequence, current first stage turbine vanes are typically cooled using a combination of internal convection heat transfer using single impingement at very low pressure ratio, while spent coolant is ejected onto the airfoil surface to provide film cooling. FIG. 6 shows an example of this prior art turbine airfoil cooling circuit.

The efficiency of the convective cooling system is measured by the amount of coolant heat-up divided by the theoretical heat-up possible. In the limits, little coolant heat-up reflects low cooling efficiency while heating the coolant to the temperature of the surface to be cooled (a theoretical maximum) yields 100% cooling efficiency. In the previous methods using single impingement, the flow could only be used once to impinge on the surface to be cooled. This restriction precludes the ability to heat the coolant substantially, thereby limiting the cooling efficiency.

BRIEF SUMMARY OF THE INVENTION

It is an object of the present invention to provide for a turbine airfoil with improved cooling efficiency over the cited prior art turbine airfoils.

It is another object of the present invention to provide for an air cooled turbine airfoil with internal cooling air passages that cannot be formed from the investment casting process.

It is another object of the present invention to provide for an air cooled turbine airfoil of the spar and shell construction.

It is another object of the present invention to provide for an air cooled turbine airfoil having a thin near-wall cooled airfoil surface.

These objectives and more are achieved with the air cooled turbine airfoil that is made up of a number of stacked laminates each having a specific cooling air circuit with each layer separated by a divider layer in order that a sequential impingement cooling passage is formed to provide impingement cooling of the airfoil. In one embodiment, the sequential impingement cooling circuit is formed using three different laminates stacked with a divider layer separating each of the other two layers and forms a cooling circuit that provides a first impingement cooling of the forward half of the pressure side airfoil wall, then a second impingement cooling of the aft half of the pressure side wall, and then a third impingement cooling of the entire suction side wall of the airfoil before discharging the spent cooling air through a row of exit cooling holes in the trailing edge of the airfoil. The alternating layers for a spar for the turbine blade or vane which forms a structural support for a shell that forms the airfoil shape of the blade or vane.

In a second embodiment of the present invention, the air cooled airfoil with the sequential cooling circuit described above is formed in a single piece airfoil by a metallic or ceramic printing process that can form the entire airfoil on a molecular level.

This printing process is developed by Mikro Systems, Inc. of Charlottesville, Va.

BRIEF DESCRIPTION OF THE SEVERAL VIEWS OF THE DRAWINGS

FIG. 1 shows a cross section view of a feed and divider layer of the laminated airfoil of the present invention.

FIG. 2 shows a cross section view of a first impingement and return layer of the laminated airfoil of the present invention.

FIG. 3 shows a cross section view of a second impingement and return layer of the laminated airfoil of the present invention.

DETAILED DESCRIPTION OF THE INVENTION

Figure 4:
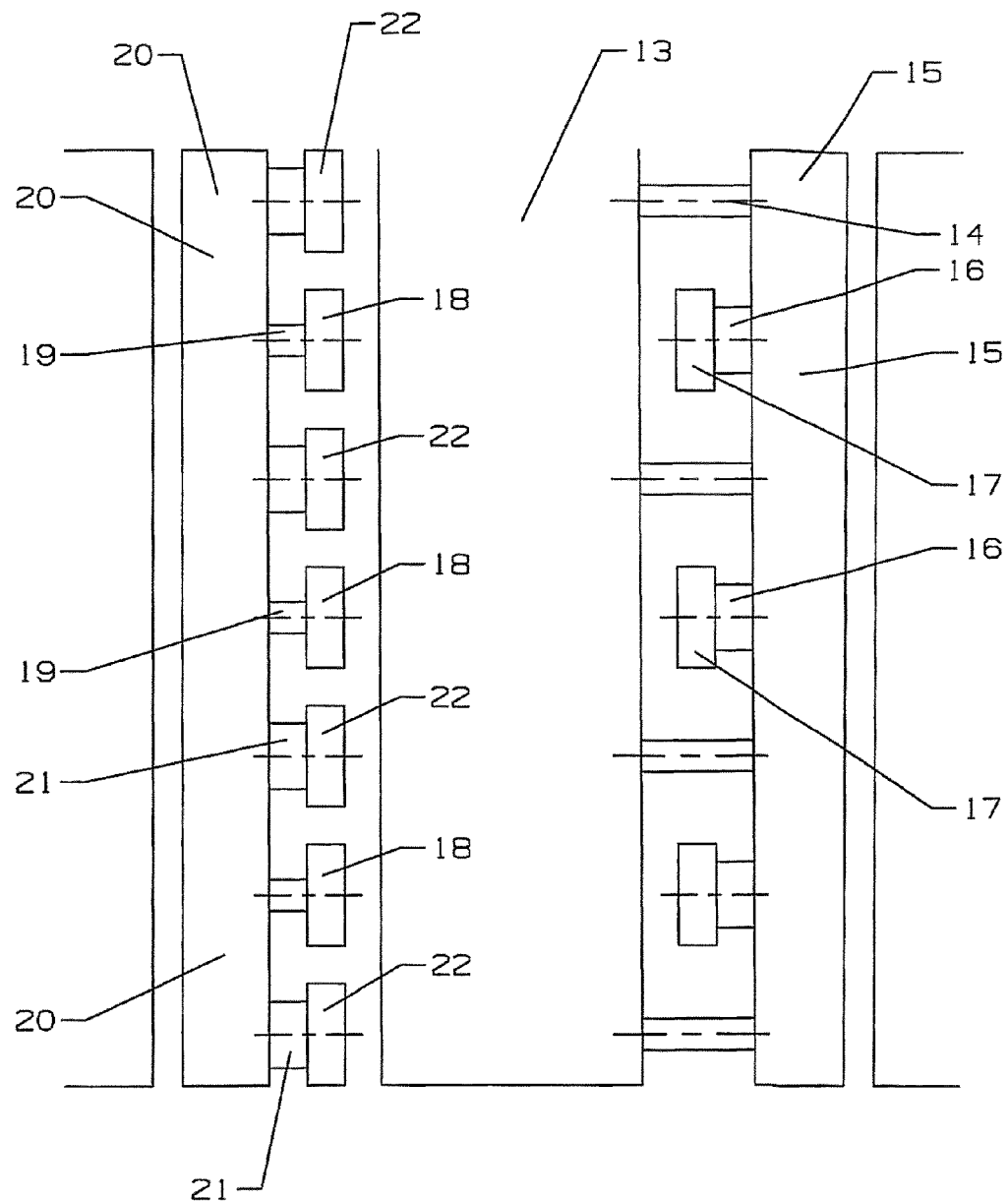

The present invention is an air cooled turbine airfoil for a gas turbine engine in which the airfoil can be part of a stator vane or a rotor blade. The following description will be directed to a turbine rotor blade, but the process and cooling circuit can also be applied to a stator vane. The airfoil is formed from a number of layers that are stacked and bonded together to form a rigid spar of a spar and shell blade assembly. The spar and shell turbine blade is disclosed in U.S. Pat. no. 7,080,971 B2 issued to Wilson et al on Jul. 25, 2006 and entitled COOLED TURBINE SPAR SHELL BLADE CONSTRUCTION, which is incorporated herein by reference in its entirety. The spar and shell construction allows for a thin wall airfoil that will provide near-wall cooling of the airfoil surface much better than would a cast airfoil. In the investment casting process, the thickness of the airfoil wall is limited to around 0.030 inches, which is a relatively thick airfoil wall. A thick wall airfoil surface will have a large temperature difference between the outer hot surface and the cooler inner surface. The thin near-wall cooled airfoil will have much lower temperature difference that lead to longer life parts.

In the first embodiment of the present invention, the airfoil is formed from three different layers as shown in FIGS. 1-3. FIG. 1 shows a feed and divider layer that provides for a feed cavity 13 for cooling air and a radial division between impingement and return layers. The FIG. 1 layer includes a leading edge rib 25 and a pressure side rib 26 located at about midway between the leading edge and trailing edge. The rib 26 separates the forward half and the at half of the airfoil on the pressure side wall. Pressure side impingement channels 15 are formed and a suction side impingement channel 20 is formed in this layer. The airfoil shell 11 fits over this layer and each of the other layers that form the spar.

FIG. 2 shows a second layer that forms an impingement and return layer with a direct impingement on the forward half of the pressure side wall, a return path or channel for the aft half on the pressure side wall, and an impingement channel on the suction side wall. This layer also includes a cooling supply cavity 13 concentric with all the other cooling supply cavities. The second layer includes impingement cooling holes 14 connected to the supply cavity 13 and arranged along the layer to provide impingement cooling to the shell backside along the forward half of the pressure side wall between the leading edge rib 25 and the pressure side rib 26. The second layer also includes return holes 16 in the aft half of the pressure side to return cooling air into a return channel 17 that extends around the trailing edge and into an impingement channel 18 that extends along the entire suction side wall. The impingement holes 14 are smaller in diameter than the return holes 16. The second layer also includes impingement holes 19 extending along the suction side that connect the inside channel 18 to the outside channel 20.

The third layer in FIG. 3 includes the cooling air supply cavity 13 with the leading edge rib 25 and pressure side rib 26 to separate the impingement channels. The third layer includes a forward half pressure side wall impingement channel 15 with return holes 16, a pressure side return channel 17, an aft half pressure side impingement channel 15 with impingement holes 19, a suction side inner return channel 22 and a suction side outer impingement channel 20 connected with return holes 21, and a first exit hole 23, a second exit hole 24 and a third exit hole 25 that discharges the spent cooling air through the trailing edge.

In the present embodiment, the turbine blade is formed by building up these three payers to form a spar for the support of the shell. The top layer would be the FIG. 2 layer, followed by a FIG. 1 later, then a FIG. 3 layer, then a FIG. 1, then a FIG. 2 layer, then a FIG. 1 layer, then a FIG. 3 layer, and repeat this for the length of the airfoil. Thus, the divider layer of FIG. 1 would be in-between the other two layers which alternate along the airfoil spanwise direction. The layers can be formed from a casting process or a machining process, of a combination of both. The separate layers are bonded together using a process such as Transient Liquid Phase (TLP) bonding, or by mechanical fasteners. The three separate layers can also be formed as a single piece with the three payers formed integral using a "printing" process that can print up the passages from bottom to top using a process developed by Mikro Systems, Inc. or Charlottesville, Va. that can print metallic and ceramic marts as a single piece with very fine details that cannot be produced using the prior art investment casting process.

Figure 5:
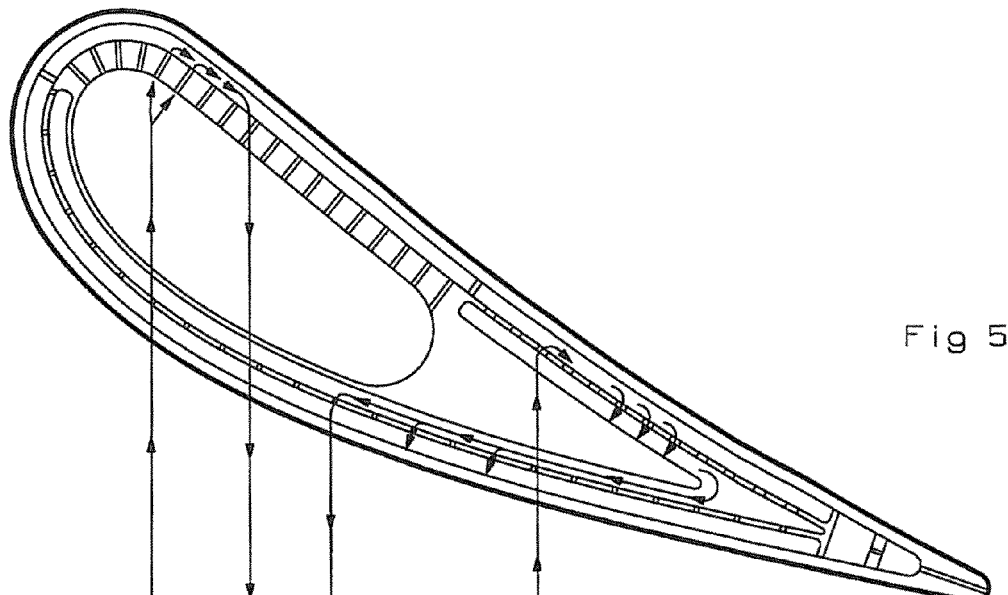
Figure 6:
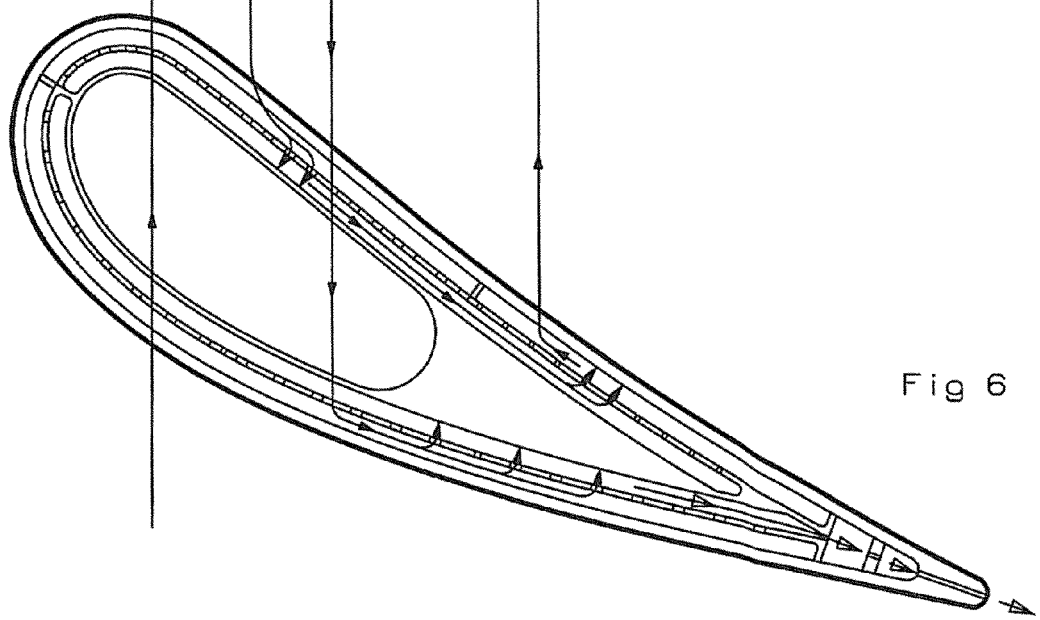

FIGS. 5 and 6 shows the two layers that form the cooling air impingement of the shell with the air flow through the sequential impingement process. Cooling air is supplied into the cooling air supply cavity 13 formed in all of the layers and then flows through the smaller impingement holes 14 formed along the forward half of the pressure side wall to provide impingement cooling here. The spent impingement cooling air then collects in the impingement channel 15 and flows into the impingement channel 15 in the FIG. 6 layer. The cooling air then flows through the return holes 16 and into the return channel 17 toward the aft half of the pressure side wall, where the cooling air flows through the second set of impingement holes 19 to provide impingement cooling to the aft half of the pressure side wall. the impingement channels are positioned along the airfoil wall while the return channels are located inward from the airfoil wall. The spent cooling air is then collected in the impingement channel 15 and flows through the return holes 16 and into the inner return channel 17 and around the trailing edge and into the return channel 18 on the suction side. From the suction side return channel 18 the cooling air flows through a third set of impingement holes 19 to provide impingement cooling for the entire suction side wall. The spent cooling air is collected in the impingement channel 20 and flows through the return holes 21 and into the return channel 22. The spent cooling air in the return channel then flows through the series of exit holes 23-25 and out through the trailing edge.

A gap is formed between the spar and the shell so that the impingement cooling can be done. The gap not only forms the impingement channel but also provides a fluid path to the return channel. The ribs on the leading edge and the pressure side separate the airfoil into the three zones which are the forward half and the aft half of the pressure side, and the entire suction side of the airfoil. The forward half of the pressure side is exposed to the highest external hot gas pressure, while the suction side is exposed to the lowest pressure on the airfoil. Thus, the cooling circuit is designed to maintain a favorable pressure difference across the wall such that the pressure of the coolant inside the airfoil is everywhere higher than the pressure of the hot gases on the opposite side of the wall. Coolant is eventually ejected from the airfoil into a relatively low pressure region on the suction side and/or trailing edge region of the airfoil.

In the embodiment of FIGS. 1-3, the second layer of FIG. 2 provides for the first impingement along the forward half of the pressure side wall and the third impingement along the entire suction side wall. The third layer of FIG. 3 provides for the second impingement of the aft half along the pressure side and the discharge through exit holes spaced along the trailing edge. The first layer of FIG. 1 separates these two impingement layers. The series of layers in FIGS. 1-3 that make up the cooling circuit are closed off at the top and the bottom of the airfoil by a layer without any holes or cavities except for the open coolant feed passage at one, or both, ends. The forward half of the pressure side wall of the airfoil is shown to be at about the midpoint between the leading edge and the trailing edge of the airfoil. However, the separation point can be moved toward or away from the leading edge depending upon the surface area of the pressure side that will receive the first impingement cooling with the highest pressure of cooling air. Thus, the pressure side ribs 26 can be positioned to separate the forward half from the aft half at any location along the pressure side wall.

The thickness of the three layers can be the same or each can be different depending upon the width of the impingement surface for the impingement cooling. FIG. 4 shows a cross section view of the sequential impingement cooling circuit. The supply cavity 13 extend the length of the airfoil and is connected through the impingement cooling holes 14 to the impingement channel 15 on the pressure side and the impingement channel 20 on the suction side. The collector channels 17 are connected through the return holes 16 to the impingement channels 15 on the pressure side. The return channels 17 on the pressure side are connected to the return channels 18 on the suction side, where the impingement holes 19 discharge the cooling air into the impingement channel 20. The return holes 21 connect the impingement channel 20 to the collection channel 22 which is also the return channel connected to the exit holes 23-25. The series of arrows in FIG. 4 shows the direction of the cooling air flow in the forward half of the pressure side and then the suction side with the aft half of the pressure side left out.

In the above embodiment, no film cooling holes are used to discharge film cooling air from the cooling circuit. However, the use of film cooling air could be used if desired and adequate pressure is available. In still another embodiment, instead of forming the spar with the series of alternating layers the entire blade or vane could be formed as a single piece using a metallic microscopic level printing process like the one developed by Mikro Systems, Inc. of Charlottesville, Va. in which a part can be "printed" from a metallic or a ceramic material with very fine detail not available with the investment casting process and from one or more metallic or ceramic materials. Thus, the spar and shell could be printed as a single piece with the sequential impingement cooling circuit described above using this printing process, or only the spar is printed and a separate shell is then secured to the spar. For the separate spar and shell embodiment, the film holes and return holes can be formed after the layers are cast or machined in the non printed embodiment. Also, in the printed embodiment, the impingement holes and return holes can be printed into the walls.

The air cooled airfoil can be printed using the Mikro Systems process in which the inner portion of the airfoil can be printed with a different metallic material than is the outer portion of the airfoil. Even more, the shell can be printed with a different material than the other two materials in order to obtain a more even overall metal temperature for the airfoil. The shell can be printed into the spar to form a single piece airfoil with both the shell and the cooling circuit formed as a single piece. The shell can be printed using a low alpha material to reduce the thermal stress developed. A TBC of a ceramic material can even be printed onto the metallic shell to form a one piece airfoil with a TBC.

The sequential cooling circuit described above can be used in an air cooled turbine stator vane or a rotor blade to provide impingement cooling. The sequential cooling circuit can also be used in stator vane end walls as well to provide cooling for these members. Also, hot sections in the combustor can be cooled using impingement cooling with the sequential cooling circuit described above in which the sequential cooling circuit can be on one wall of the combustor. Any surface exposed to a relatively hot gas flow in which impingement cooling of the backside is required to prevent over-temperature of the metal surface can be cooling using the sequential impingement cooling circuit of the present invention.

I claim the following:

1. An air cooled turbine airfoil comprising:
   a cooling supply cavity formed in a forward half of the airfoil;
   a plurality of rows of first impingement holes arranged along a forward half of the pressure side of the airfoil;
   a plurality of rows of second impingement holes arranged along an aft half of the pressure side of the airfoil;
   a plurality of rows of third impingement holes arranged along the entire suction side of the airfoil; and,
   cooling air collection and return channel means to collect the impingement cooling air and redirect the spent cooling air from the first impingement holes, then to the second impingement holes, and then to the third impingement holes to provide sequential impingement cooling of the airfoil walls.

2. The air cooled turbine airfoil of claim 1, and further comprising:
   a separation between the forward half and the aft half of the pressure side wall is at about the midway point between the leading edge and the trailing edge.

3. The air cooled turbine airfoil of claim 1, and further comprising:
   the airfoil is a spar and shell constructed airfoil.

4. The air cooled turbine airfoil of claim 1, and further comprising:
   the sequential impingement cooling circuit is formed by an alternating series of layers bonded together.

5. The air cooled turbine airfoil of claim 4, and further comprising:
   the first impingement holes and the third impingement holes are formed in a first layer; and,
   the second impingement holes are formed in a second layer.

6. The air cooled turbine airfoil of claim 5, and further comprising:
   the first layer includes a return channel for the second impingement cooling air; and,
   the second layer includes a return channel for the first impingement cooling air and a return channel for the third impingement cooling air.

7. The air cooled turbine airfoil of claim 6, and further comprising:
   the first layers and the second layers are about the same thickness.

8. The air cooled turbine airfoil of claim 6, and further comprising:
   the first layers and the second layers alternate along the airfoil in a spanwise direction; and,
   a divider layer is positioned between the first and second layers.

9. The air cooled turbine airfoil of claim 3, and further comprising:
   the spar includes the impingement cooling circuit; and,
   the shell forms a gap with the spar to form the impingement cavities.

10. The air cooled turbine airfoil of claim 1, and further comprising:
    the first, second and third impingement holes form a closed cooling air path through the airfoil.

11. A process for cooling a turbine airfoil, the airfoil having a pressure side wall and a suction side wall, the process comprising the steps of:
    supplying pressurized cooling air to the airfoil;
    impinging the pressurized cooling air onto a backside of a forward half of the pressure side wall of the airfoil;

collecting the spent cooling air and impinging the cooling air onto backside of the aft half of the pressure side wall;

collecting the spent cooling air and impinging the cooling air onto the backside of the suction side wall of the airfoil; and, collecting the spent cooling air and discharging the cooling air out through the trailing edge.

12. The process for cooling a turbine airfoil of claim 11, and further comprising the step of:

the step of cooling the suction side wall includes impinging cooling air on the backside of the suction side wall from the leading edge region to the trailing edge region of the airfoil.

13. The process for cooling a turbine airfoil of claim 11, and further comprising the step of:

passing the three impingement cooling air flows through a closed cooling air path within the airfoil.

* * * * *

UNITED STATES PATENT AND TRADEMARK OFFICE
CERTIFICATE OF CORRECTION

| | | |
|---|---|---|
| PATENT NO. | : 8,096,766 B1 | Page 1 of 1 |
| APPLICATION NO. | : 12/351624 | |
| DATED | : January 17, 2012 | |
| INVENTOR(S) | : James P. Downs | |

It is certified that error appears in the above-identified patent and that said Letters Patent is hereby corrected as shown below:

In The Specification

Column 1, line 4 replace with the following new paragraph:

This invention was made with Government support under contract number DE-FE0006696 awarded by Department of Energy. The Government has certain rights in the invention.

Signed and Sealed this
Twelfth Day of July, 2016

Michelle K. Lee
*Director of the United States Patent and Trademark Office*